(12) United States Patent
Goradia et al.

(10) Patent No.: US 11,915,019 B2
(45) Date of Patent: Feb. 27, 2024

(54) METHODS AND SYSTEMS FOR DISPLAYING A REMOTE BROWSER ISOLATION (RBI) CONFIGURATION WINDOW

(71) Applicant: Versa Networks, Inc., Santa Clara, CA (US)

(72) Inventors: Harnish Narendra Goradia, Milpitas, CA (US); Barbara Torres, Mountain View, CA (US); Akshay Adhikari, San Jose, CA (US); Ratik Kapoor, San Jose, CA (US)

(73) Assignee: Versa Networks, Inc., San Jose, CA (US)

( * ) Notice: Subject to any disclaimer, the term of this patent is extended or adjusted under 35 U.S.C. 154(b) by 86 days.

(21) Appl. No.: 17/878,844

(22) Filed: Aug. 1, 2022

(65) Prior Publication Data
US 2024/0036892 A1 Feb. 1, 2024

(51) Int. Cl.
| | | |
|---|---|---|
| G06F 9/44 | (2018.01) | |
| G06F 3/04817 | (2022.01) | |
| G06F 3/0482 | (2013.01) | |
| G06F 9/451 | (2018.01) | |

(52) U.S. Cl.
CPC .......... *G06F 9/452* (2018.02); *G06F 3/04817* (2013.01); *G06F 3/0482* (2013.01)

(58) Field of Classification Search
CPC ........................................................ G06F 9/542
USPC ........................................................ 719/329
See application file for complete search history.

(56) References Cited

U.S. PATENT DOCUMENTS

| | | | |
|---|---|---|---|
| 10,552,639 B1 * | 2/2020 | Buzbee | G06F 21/6245 |
| 2011/0047467 A1 | 2/2011 | Porter | |
| 2021/0194871 A1 * | 6/2021 | Batchu | H04L 63/102 |
| 2021/0218571 A1 | 7/2021 | Ansari et al. | |
| 2021/0250333 A1 | 8/2021 | Negrea et al. | |
| 2022/0100902 A1 * | 3/2022 | Juniper | H04L 63/0281 |
| 2022/0109700 A1 | 4/2022 | Guruswamy et al. | |

OTHER PUBLICATIONS

Palo Alto Networks Inc., "Prisma Access (Cloud Management)", 2022, 12 pgs.

(Continued)

*Primary Examiner* — Timothy A Mudrick
(74) *Attorney, Agent, or Firm* — Loza & Loza, LLP

(57) ABSTRACT

A non-transitory computer readable medium, a system, and a method for displaying a remote browser isolation (RBI) configuration window are disclosed. In an embodiment, a non-transitory computer readable medium includes instructions to be executed in a computer system, where the instructions when executed in the computer system perform a method comprising displaying an RBI configuration window, displaying an on/off activation feature within the RBI configuration window, and displaying an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

20 Claims, 12 Drawing Sheets

(56) References Cited

OTHER PUBLICATIONS

Netskope, "Netskope Remote Browser Isolation; Safely isolate uncategorized and risky websites", Datasheet, 2021, 2 pgs.
Cloudflare, "Protect teams with Zero Trust Browsing", https://www.cloudflare.com/products/zero-trust/browser-isolation/, downloaded Jul. 28, 2022, 8 pgs.

* cited by examiner

METHODS AND SYSTEMS FOR DISPLAYING A REMOTE BROWSER ISOLATION (RBI) CONFIGURATION WINDOW

BACKGROUND

When browsing the World Wide Web (WWW), client devices, e.g., personal computers (PCs), may execute various browsing operations, such as loading webpages, downloading data, uploading content, etc. Remote browser isolation (RBI) policies may be configured by a user and implemented via a client device to limit exposure to harmful webpage code, malware infections, cyber-attacks, and the like. However, the user may not be able to easily configure an RBI policy and may not even be aware of actions protected by the RBI policy.

SUMMARY

A non-transitory computer readable medium, a system, and a method for displaying a remote browser isolation (RBI) configuration window are disclosed. In an embodiment, a non-transitory computer readable medium includes instructions to be executed in a computer system, where the instructions when executed in the computer system perform a method comprising displaying an RBI configuration window, displaying an on/off activation feature within the RBI configuration window, and displaying an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

In an embodiment, the spatially grouped sets that include the RBI profile selector, the RBI profile identifier text, and the selectable RBI protected browsing action icons are displayed in a series of rows within the RBI profile selection menu.

In an embodiment, the spatially grouped sets that include the RBI profile selector, the RBI profile identifier text, and the selectable RBI protected browsing action icons correspond to RBI profiles.

In an embodiment, the RBI profile identifier text and the selectable RBI protected browsing action icons of the corresponding RBI profiles are displayed linearly within RBI profile panels.

In an embodiment, the RBI profile identifier text and the selectable RBI protected browsing action icons of the corresponding RBI profiles are displayed linearly within RBI profile panels, and the RBI profile selectors of the corresponding RBI profiles are adjacent to the RBI profile panels.

In an embodiment, when one of the RBI profile selectors is selected, the selectable RBI protected browsing action icons that correspond to a same RBI profile can be selected.

In an embodiment, the selectable RBI protected browsing action icons include a symbol, a label, and a selection indicator.

In an embodiment, the symbol is at least one of a book symbol, a page with an arrow symbol, a page symbol, a clipboard symbol, a cookie symbol, and a cookie with a trash can symbol, the label is at least one of read only, uploads, downloads, form submissions, clipboard access, cookie persistence, and cookies, and the selection indicator is at least one of a checkmark in a semicircle, a line through a circle, and selection indicating text.

In an embodiment, the selectable RBI protected browsing action icons that are selected are indicated by at least one of a selected indicator and a selected color.

In an embodiment, the selected indicator is a checkmark in a semicircle, and the selected color is green.

In an embodiment, the selectable RBI protected browsing action icons that are unselected are indicated by at least one of an unselected indicator and an unselected color.

In an embodiment, the unselected indicator is a line through a circle, and the unselected color is gray.

In an embodiment, the selectable RBI protected browsing action icons that are selected are included in the RBI policy, and the selectable RBI protected browsing action icons that are unselected are not included in the RBI policy.

In an embodiment, when the on/off activation feature is set to off, the RBI profile selector of the plurality of spatially grouped sets cannot be selected.

In an embodiment, the on/off activation feature is displayed by a togglable button that controls whether RBI is enabled.

In an embodiment, the RBI profile identifier text indicates corresponding RBI profiles, and the corresponding RBI profiles include read only, preview downloads, allow downloads, block uploads, and full interaction.

In an embodiment, the spatially grouped sets that include the RBI profile selector, the RBI profile identifier text, and the selectable RBI protected browsing action icons correspond to an RBI profile, where the selectable RBI protected browsing action icons are a profile specific set of icons for the corresponding RBI profile, and the selectable RBI protected browsing action icons include a symbol, a label, and a selection indicator, where the symbol and the label indicate the corresponding RBI protected browsing action and the selection indicator indicates whether the corresponding RBI protected browsing action is included in the RBI policy.

In an embodiment, the spatially grouped sets that include the RBI profile selector, the RBI profile identifier text, and the selectable RBI protected browsing action icons correspond to an RBI profile and are displayed linearly within the RBI profile selection menu, and the selectable RBI protected browsing action icons include a symbol, a label, and a selection indicator, where the symbol and the label indicate the corresponding RBI protected browsing action and the selection indicator indicates whether the corresponding RBI protected browsing action is included in the RBI policy.

A system for displaying an RBI configuration window is also disclosed. In an embodiment, the system includes at least one processor configured to execute computer readable instructions stored in at least memory, where the computer readable instructions when executed by the at least one processor perform a method comprising displaying an RBI configuration window, displaying an on/off activation feature within the RBI configuration window, and displaying an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

A method for displaying an RBI configuration window is also disclosed. In an embodiment, the method includes displaying an RBI configuration window, displaying an on/off activation feature within the RBI configuration window, and displaying an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
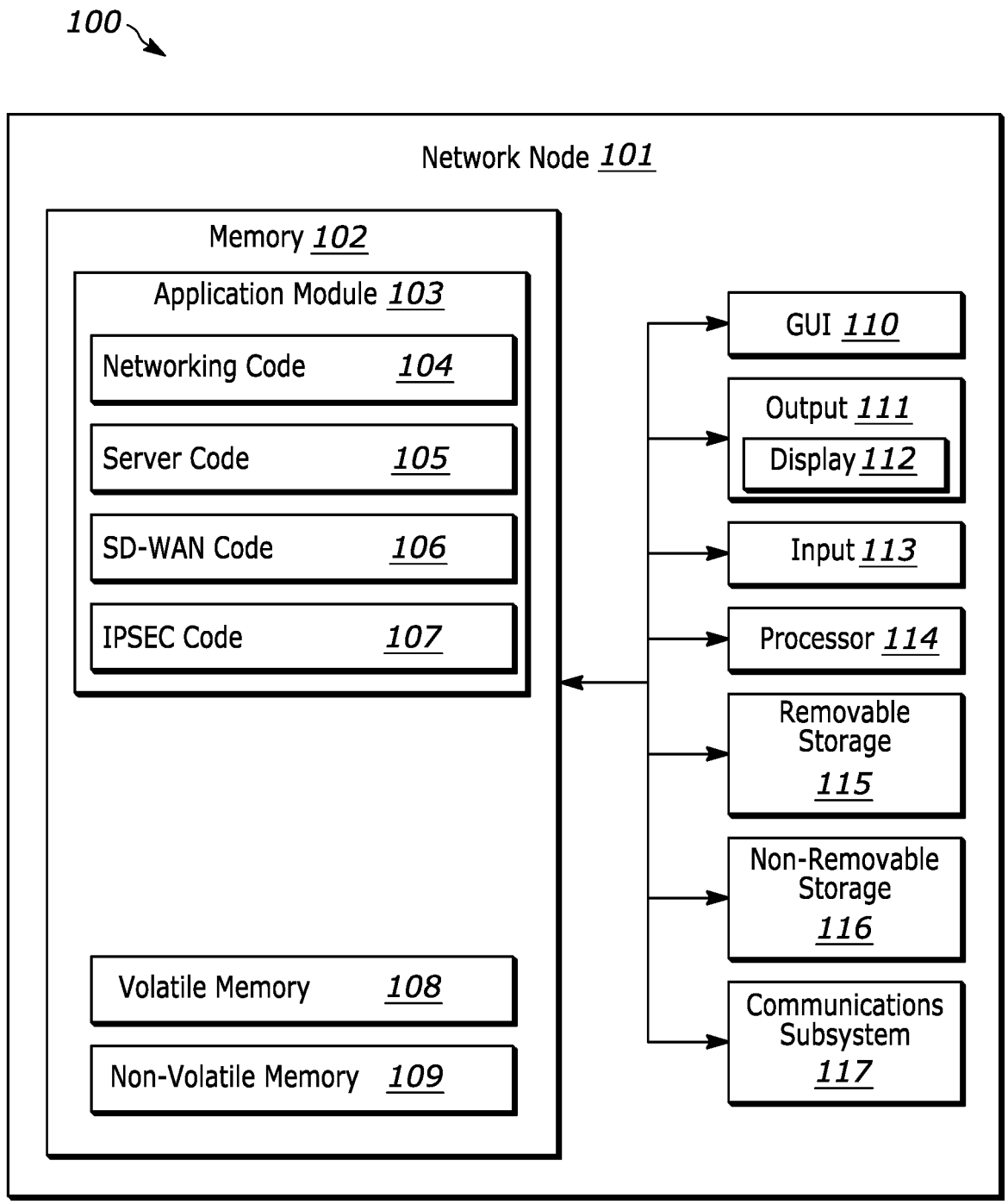
FIG. 1 is a high-level block diagram of a network node.

FIG. 1 is a high-level block diagram 100 of a network node 101. The network node 101 may be in the form of a computer configured to interface with controllers, peripheral devices, and other elements disclosed herein may include one or more processors 114, memory 102, removable storage 115, and non-removable storage 116. The memory 102 may include volatile memory 108 and/or non-volatile memory 109. The network node 101 may include or have access to a computing environment that includes a variety of transitory and non-transitory computer-readable media such as the volatile memory 108, the non-volatile memory 109, the removable storage 115 and the non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

The network node 101 may include, or have access to, a computing environment that includes an input device 113, an output device 111, and a communications subsystem 117. The network node 101 may operate in a networked environment using the communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, radio frequency identification (RFID) enabled device, a peer device, other common network node, or the like. The communication connection may include a local area network (LAN), a wide area network (WAN), Bluetooth connection, or other networks.

The output device 111 may be provided as a computer monitor, but may include any output device. The output device 111 and/or the input device 113 may include a data collection apparatus associated with the network node 101. In addition, the input device 113, which commonly includes a computer keyboard and/or pointing device such as a computer mouse, computer track pad, touch screen, or the like, allows a user to select and instruct the network node 101. A user interface can be provided using the output device 111 and the input device 113. The output device 111 may include a display 112 for displaying data and information for a user, or for interactively displaying a graphical user interface (GUI) 110. A GUI is typically responsive of user inputs entered through the input device 113 and typically displays images and data on the display 112.

As described herein, "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with the input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in the application module 103, can include or be representative of software routines, software subroutines, software objects, etc. described herein, are stored on a computer-readable medium and are executable by the processor device (also called a processing unit) 114 of the network node 101. The application module 103 can include computer code such as networking code 104, server code 105, software defined wide area network (SD-WAN) code 106, and Internet Protocol Security (IPSEC) code 107. A hard drive, CD-ROM, RAM, Flash Memory, and a Universal Serial Bus (USB) drive are just some examples of articles including a computer-readable medium.

Figure 2:
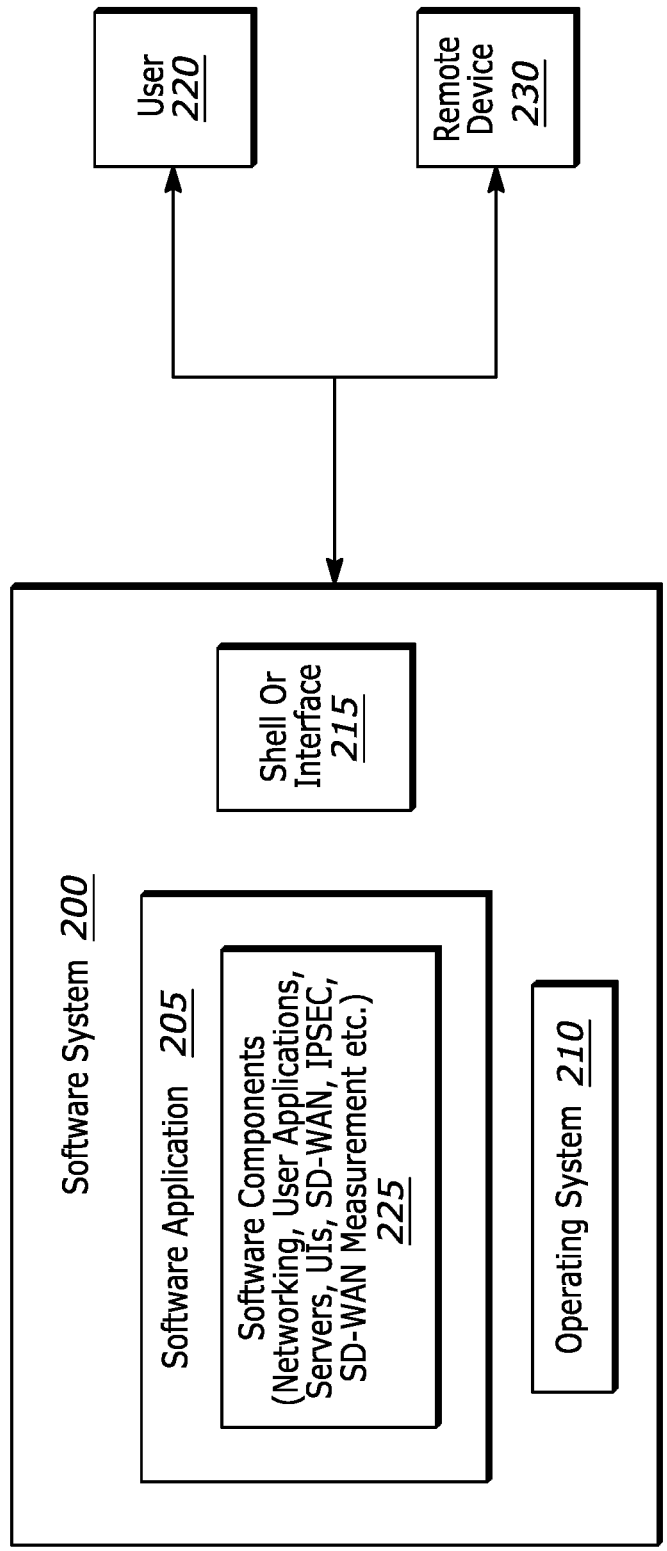
FIG. 2 is a high-level block diagram of a software system.

FIG. 2 is a high-level block diagram of a software system 200. FIG. 2 illustrates a software system 200, which may be employed for directing the operation of a data-processing systems such as the network node 101. Software applications may be stored in the memory 102, on the removable storage 115, and/or on the non-removable storage 116, and generally include and/or are associated with a kernel or operating system 210 and a shell or interface 215. One or more application programs may be "loaded" (i.e., transferred from the removable storage 115 or the non-removable storage 116 into the memory 102) for execution by the network node 101. A software application 205 can include software components 225 such as software modules, software subroutines, software objects, network code, user application code, server code, user interface (UI) code, SD-WAN code, IPSEC code, SD-WAN measurement code, etc. The software system 200 can have multiple software applications each containing software components. The network node 101 can receive user commands and data through the interface 215, which can include the input device 113, the output device 111, and the communications subsystem 117 accessible by a user 220 or a remote device 230. These inputs may then be acted upon by the network node 101 in accordance with instructions from the operating system 210 and/or the software application 205 and any software components 225 thereof.

Generally, the software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implements a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms "application" or "component" may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, the operating system 210 and the GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to the operating system 210 and the interface 215. The software application 205 can include, for example, the software components 225, which can include instructions for carrying out steps or logical operations such as those shown and described herein.

The description herein is presented with respect to embodiments that can be embodied in the context of, or require the use of, a data-processing system such as the network node 101, in conjunction with program code in the application module 103, in the memory 102, the software system 200, or the network node 101. The disclosed embodiments, however, are not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM, and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including a multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

In some embodiments, when a user of a client device (e.g., network node 101) is browsing the World Wide Web (WWW), loading webpages, displaying webpages, downloading data, uploading data, etc. using applications which involve a browser loading content from remote and/or unsecure sources, the client device (and/or internal networks used by the client device) is subject to consequences such as harmful webpage code, malware infections, cyber-attacks, and the like. To protect the client device from experiencing such consequences, remote browser isolation (RBI) (sometimes referred to as "web isolation" or "browser isolation") may be implemented to help the user avoid potentially risky activity.

As described herein, "RBI" may be defined as a technology that separates browsing activity from a client device by hosting and running a browsing application at a secure location (e.g., a designated server, a remote server, a remote cloud, a remote cloud-based container, etc.), such that the secure location renders and pushes the browsing application or a Uniform Resource Locator (URL) to the client device. The secure location may be an RBI server that is connected to the client device and/or to the internet, and that protects the browsing, the client device, and/or the internal network(s) from cyber threats.

As described herein, browsing that is protected by RBI may be referred to as "RBI protected browsing", and may be displayed via a GUI of the client device. In an embodiment, the GUI of the client device may display the RBI protected browsing via a browser (e.g., GOOGLE CHROME, SAFARI, FIREFOX, INTERNET EXPLORER, etc.) that a user can use to access the WWW and that allows the user to search and view information via the internet. As described herein, a browser that displays RBI protected browsing may be referred to as an "RBI protected browser". In some embodiments, the RBI protected browser may include a combination of websites or webpages that are protected by RBI protected browsing and that are not protected by the RBI protected browsing.

In an embodiment, RBI protected browsing involves certain limitations and/or restrictions that protect the user from being subject to cyber threats. As described herein, the limitations and/or the restrictions that a user is subject to during RBI protected browsing may be referred to as "RBI protected browsing actions". In an embodiment, one or more RBI protected browsing actions are included in an RBI profile that may be configured as part of an RBI policy. As described herein, an "RBI policy" may be defined by an RBI profile where one or more RBI protected browsing actions can be triggered by RBI protected browsing. In some embodiments, the RBI protected browsing actions of an RBI profile included in an RBI policy are a created configuration of a predefined RBI policy or a custom defined RBI policy (e.g., block uploads, preview downloads, read only, etc.) for an application, a URL, and/or a user. The RBI policy may be configured by a security operations administrator, or an information technology (IT) administrator of an enterprise via an RBI configuration window. The RBI configuration window may be displayed as part of an application or a browser for configuring an RBI policy.

It is important for the RBI configuration window to allow a user (e.g., security operations administrator or IT administrator of an enterprise) to easily configure an RBI policy so that the correct restrictions and/or limitations are included in the RBI policy. However, conventional RBI configuration windows may not provide a clear visual indication (to the user) that a certain RBI profile or RBI protected browsing action(s) are included in an RBI policy. As such, the user may be unaware of whether or not the certain RBI profile or RBI protected browsing action(s) will be protected during RBI protected browsing. Consequently, a client device may be more likely to be exposed to harmful browsing activity during the RBI protected browsing.

In accordance with an embodiment of the invention, a non-transitory computer readable medium that includes instructions to be executed in a computer system, where the instructions when executed in the computer system perform a method that includes displaying an RBI configuration window, displaying an on/off activation feature within the RBI configuration window, and displaying an RBI profile selection menu within the RBI configuration window, wherein the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

By displaying the RBI profile selection menu using the plurality of spatially grouped sets, the RBI configuration window may be navigated with minimal eye movement and minimal user input (e.g., cursor movement, mouse clicking, and/or keyboard clicking). In addition, the RBI profile selector, the RBI profile identifier text, and the selectable RBI protected browsing action icons allow the RBI configuration window to provide a clear visual representation of the different RBI profiles and corresponding RBI protected browsing actions that can be selected by the user (e.g., IT administrator of an enterprise). The RBI configuration window is organized in an easily understandable intuitive way that eases use for the user. As such, the RBI policy may be configured with greater ease and accuracy, causing a client device that implements the RBI policy to more likely be subject to the correct combination restrictions and/or limitations as intended by the user, all of which can greatly improve the user experience.

While an RBI policy configured by a user (e.g., IT administrator of an enterprise) on a client device may be implemented during RBI protected browsing on the user's client device, the RBI policy configured by the user may also be implemented at other user's client devices. In an embodiment, a user (e.g., IT administrator of an enterprise) configures an RBI policy for a different user. For example, an IT administrator of an enterprise can configure RBI policies for employees of the enterprise, such that each employee or category of employee has a particular RBI policy in place. In some embodiments, the RBI policy configured by the user may be implemented at one or more other client devices included in an enterprise network, or that are connected to an enterprise cloud or an enterprise server. Thus, the user experience may be further enhanced as the user (e.g., IT administrator) can easily configure one or more RBI policies for a variety of employees or employee categories.

An example of a client device that includes a display for displaying an RBI configuration window is described in further detail with reference to FIG. 3.

Figure 3:
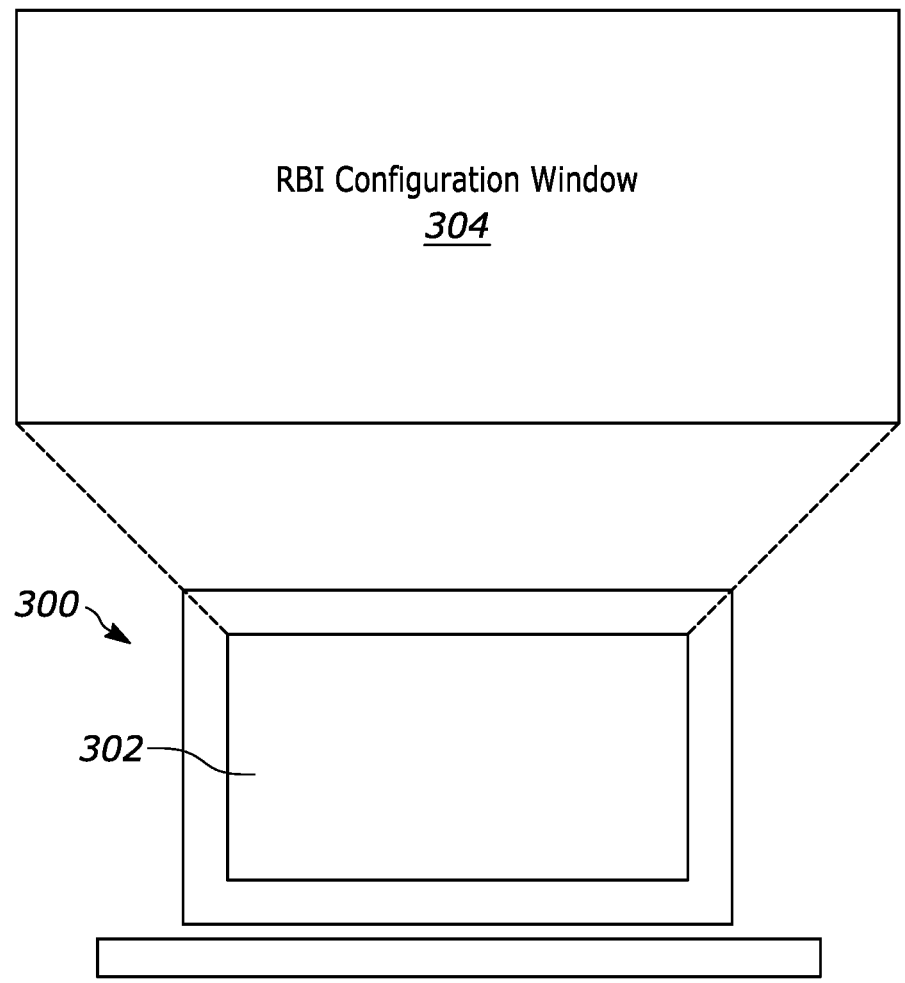
FIG. 3 depicts a device that includes a display for displaying a Remote Browser Isolation (RBI) configuration window.

FIG. 3 depicts a client device 300 that includes a display 302 for displaying an RBI configuration window 304. The client device 300 may include the network node 101 (FIG. 1) and the software system 200 (FIG. 2), and may be, for example, a laptop, a mobile device, a desktop, or the like. In addition, the client device 300 includes a user interface (e.g., a keyboard and/or a mouse) for user input(s), and a display 302 for interactively displaying a GUI. An RBI server (not shown) enables RBI protected browsing at the client device 300 and may be a remote server, a remote cloud, a remote cloud-based container, or the like. The client device 300 may be connected to the RBI server and internet (not shown) via a wireless connection (e.g., wireless LAN, wireless WAN, Bluetooth, etc.), a wired connection (e.g., ethernet), or a combination thereof.

The RBI configuration window 304 is displayed by the display 302 via a GUI. In some embodiments, the RBI configuration window 304 is displayed as part of an application or a browser for configuring an RBI policy. The RBI configuration window 304 may include a plurality of interactive elements (e.g., an on/off activation feature, RBI profile selectors, RBI profile identifier text, and selectable RBI protected browsing action icons) for configuring the RBI policy. As an example, a user may navigate the RBI configuration window 304 (e.g., using a mouse and/or a keyboard connected to the client device 300) to configure the RBI policy. Examples of the RBI configuration window 304 are described in further detail with reference to FIGS. 4-7.

Figure 4:
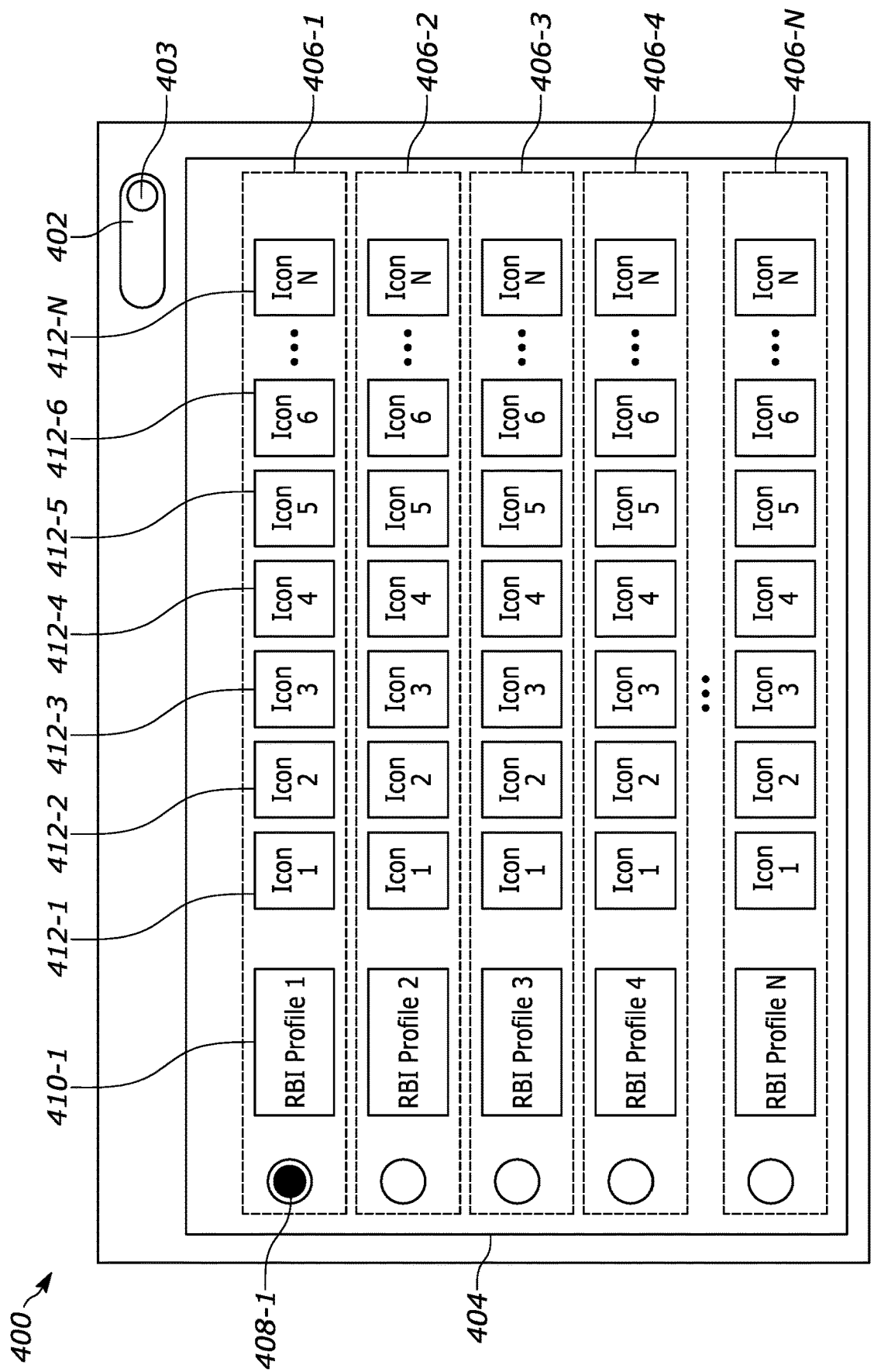
FIG. 4 depicts an example of an RBI configuration window that includes an on/off activation feature and an RBI profile selection menu.

FIG. 4 depicts an example of an RBI configuration window 400 that includes an on/off activation feature 402 and an RBI profile selection menu 404. In some embodiments, the RBI configuration window 400 represents the RBI configuration window 304 and is displayed via a GUI that is displayed on the display 302 of the client device 300. As an example, the RBI configuration window 400 is displayed as part of an application or a browser that is run (e.g., processed) by the client device. Various elements of the RBI configuration window 400 may be controlled by a user to configure an RBI policy for RBI protected browsing.

The on/off activation feature 402 is a togglable button that may be controlled (e.g., clicked on) by a user of a client device to switch the on/off activation feature between an "ON" state and an "OFF" state. In some embodiments, switching the state of the on/off activation feature 402 involves clicking on either side of the on/off activation feature, sliding an on/off indicator 403 from side to side within the on/off activation feature, or performing a similar action to move the on/off indicator. In the embodiment shown in FIG. 4, the on/off activation feature 402 is set to the "ON" state, such that the on/off indicator 403 is on a right side of the on/off activation feature. When the on/off activation feature 402 is set to the "ON" state, RBI is enabled, an RBI policy may be configured, and the user is able to interact with (e.g., click on) the elements included in the RBI profile selection menu 404. Although not shown, the on/off activation feature 402 may also be set to the "OFF" state, such that the on/off indicator 403 may be on a left side of the on/off activation feature. An embodiment where the on/off activation feature 402 is set to the "OFF" state is described in further detail with reference to FIG. 6.

The on/off activation feature 402 is displayed within the RBI configuration window 400. In an embodiment, the on/off activation feature 402 is displayed in an upper right portion of the RBI configuration window 400 above the RBI profile selection menu 404. In some embodiments, the on/off activation feature 402 and/or the on/off indicator 403 are transparent, translucent, and/or opaque. In some embodiments, the on/off activation feature 402 and the on/off indicator 403 may be different colors so that a user is able to identify which side of the on/off activation feature the on/off indicator is on. As an example, the on/off activation feature 402 is blue and the on/off indicator 403 is white.

Although not shown, the on/off activation feature 402 may also be displayed in different areas within the RBI configuration window. For example, the on/off activation feature may be displayed within the RBI configuration window in an upper left portion, an upper center portion, or below the RBI profile selection menu 404 in a bottom left portion, a bottom right portion, or a bottom center portion. In addition, although the on/off activation feature 402 and the on/off indicator 403 are displayed as circular shapes, the on/off activation feature and/or the on/off indicator may also be displayed as rectangular shapes or other similar shapes. The on/off activation feature 402 may also be represented by an activation button (or other similar switch) that switches between an "ON" state and an "OFF" state. Additionally, the on/off indicator 403 may include an indicator symbol (e.g., a check mark, a shield, an "X", etc.) within the on/off indicator.

The RBI profile selection menu 404 is displayed within the RBI configuration window 400 below the on/off activation feature 402. In an embodiment, the RBI profile selection menu 404 includes a plurality of spatially grouped sets 406-1, 406-2, 406-3, 406-4, and 406-N that are displayed in a series of rows. In an embodiment, spatially grouped set 406-N represents a fifth or greater spatially grouped set. In some embodiments, the RBI profile selection menu is outlined by a frame or a border that surrounds the plurality of spatially group sets. Although not shown, there may also be fewer than five spatially grouped sets. In addition, the plurality of spatially grouped sets 406-1, 406-2, 406-3, 406-4, and 406-N may be displayed in a series of columns, in a series of clusters, or other similar spatial arrangement. An embodiment where the plurality of spatially grouped sets are displayed in a series of clusters is described in further detail with reference to FIG. 7.

Each spatially grouped set includes a group of elements or features (e.g., an RBI profile selector, RBI profile identifier text, and selectable RBI protected browsing action icons) that are displayed around or near each other in a similar area. In some embodiments, each spatially grouped set is outlined by a frame or a border that surrounds and visually associates the group of elements or features included in the spatially grouped set. Features, aspects, and/or reference numbers of the RBI profile selector, the RBI profile identifier text, and the selectable RBI protected browsing action icons are described herein with reference to spatially grouped set 406-1 but may be similarly applied to spatially grouped sets 406-2, 406-3, 406-4, and 406-N. Reference numbers for the RBI profile selector, the RBI profile identifier text, and the selectable RBI protected browsing action icons of spatially grouped sets 406-2, 406-3, 406-4, and 406-N are not included in FIG. 4 for clarity purposes.

Spatially grouped set 406-1 includes RBI profile selector 408-1, RBI profile identifier text 410-1, and at least six selectable RBI protected browsing action icons 412-1, 412-2, 412-3, 412-4, 412-5, 412-6, and 412-N. In an embodiment, the RBI profile selector, the RBI profile identifier text, and the RBI protected browsing action icons included in spatially grouped set 406-1 are displayed linearly and correspond to an RBI profile (e.g., RBI Profile 1).

The RBI profile selector 408-1 is a selectable button that indicates whether the RBI profile (e.g., RBI Profile 1) of spatially grouped set 406-1 is selected or unselected, and that controls which selectable RBI protected browsing action icons may be interacted with by a user. The RBI profile selector 408-1 can be selected (e.g., clicked on) by a user of a client device to select a corresponding RBI profile (e.g., RBI Profile 1). In some embodiments, the RBI profile selector 408-1 can also become selected when the user clicks on the RBI profile identifier text or on one of the selectable RBI protected browsing action icons of spatially grouped set 406-1. In some embodiments, only one RBI profile selector may be selected at once when configuring an RBI policy. As an example, only one RBI profile selector may be selected at once because only one RBI profile may be included in an RBI policy. In such an example, the RBI profiles may be mutually exclusive. In some embodiments, more than one RBI profile selector may be selected at once when configuring an RBI policy.

In the embodiment shown in FIG. 4, the RBI profile selector 408-1 is selected, such that the RBI profile selector is filled in to indicate that the RBI profile selector of RBI Profile 1 is selected. When the RBI profile selector 408-1 is selected, the selectable RBI protected browsing action icons 412-1, 412-2, 412-3, 412-4, 412-5, 412-6, and 412-N that correspond to RBI Profile 1 can be selected or unselected as part of an RBI policy. When an RBI profile selector is unselected, for example, as shown by RBI profile selector of spatially grouped sets 406-2, 406-3, 406-4, and 406-N, the RBI profile selector is not filled in and the selectable RBI protected browsing action icons that correspond to the same RBI profile as the RBI selector cannot be included in the RBI policy.

The RBI profile selector 408-1 is displayed as being a circular shape, but may also be a rectangular shape, triangular shape, or the like. In some embodiments, the RBI profile selector may be displayed as an icon (e.g., a book, an eye, an arrow, etc.) that resembles the corresponding RBI profile of the RBI profile selector. In addition, the RBI profile selector 408-1 is displayed linearly with the RBI profile identifier text and the selectable RBI protected browsing action icons of spatially grouped set 406-1. The RBI profile selector 408-1 is also displayed as being adjacent to the RBI profile identifier text 410-1 on one side, and adjacent to an edge of the RBI profile selection menu 404 on another side. Although not shown, the RBI profile selector 408-1 may also be displayed between the RBI profile identifier text and the selectable RBI protected browsing action icons, between selectable RBI protected browsing action icon 412-N and the RBI profile selection menu 404, or somewhere else near the other elements included in spatially grouped set 406-1.

The RBI profile identifier text 410-1 indicates a corresponding RBI profile (e.g., RBI Profile 1) of spatially grouped set 406-1. Although included in spatially grouped set 406-N, "RBI Profile N" represents a fifth or greater RBI profile included in the RBI profile selection menu 404. In some embodiments, the RBI profile identifier text 410-1 is outlined by a frame or a border that surrounds the RBI profile identifier text. Examples of the corresponding RBI profiles indicated by the RBI profile identifier text include, but are not limited to, read only, preview downloads, allow downloads, block uploads, and full interaction.

The RBI profile identifier text 410-1 is displayed linearly with the RBI profile selector and the selectable RBI protected browsing action icons of spatially grouped set 406-1. The RBI profile identifier text 410-1 is also displayed as being adjacent to the RBI profile selector 408-1 on one side, and adjacent to selectable RBI protected browsing action icon 412-1 on another side. Although not shown, the RBI profile identifier text 410-1 may also be displayed between the RBI profile selection menu 404 and the RBI profile selector 408-1, between selectable RBI protected browsing action icon 412-N and the RBI profile selection menu 404, or somewhere else near the other elements included in spatially grouped set 406-1.

The selectable RBI protected browsing action icons 412-1, 412-2, 412-3, 412-4, 412-5, 412-6, and 412-N correspond to Icon 1, Icon 2, Icon 3, Icon 4, Icon 5, Icon 6, and Icon N, respectively. In an embodiment, selectable RBI protected browsing action 412-N represents a seventh or greater selectable RBI protected browsing action icon included in spatially grouped set 406-1. Although not shown, there may also be fewer than seven selectable RBI protected browsing action icons.

The selectable RBI protected browsing action icons 412-1, 412-2, 412-3, 412-4, 412-5, 412-6, and 412-N are selectable icons that indicate whether a corresponding RBI protected browsing action is selected or unselected. As described herein, RBI protected browsing action icons that are "included" in an RBI profile may be "selected" or "activated", such that the selected RBI protected browsing action icons of the RBI profile correspond to RBI protected browsing actions that are included in an RBI policy and that may be enforced during RBI protected browsing. In an embodiment, the selectable RBI protected browsing action icons are a combination of presented icons that are specific to a corresponding RBI profile (e.g., RBI Profile 1). By having the selectable RBI protected browsing action icons specific to the corresponding RBI profile, a user does not need to determine which RBI protect browsing actions or icons correspond to which RBI profile. The selectable RBI protected browsing action icons may be automatically provided to the user to further improve convenience for the user.

The selectable RBI protected browsing action icons 412-1, 412-2, 412-3, 412-4, 412-5, 412-6, and 412-N can be selected (e.g., clicked on) by a user of a client device to select certain RBI protected browsing actions to be included in an RBI profile (e.g., RBI Profile 1) for an RBI policy. In some embodiments, the selectable RBI protected browsing action icons can (only) become selected if the RBI profile selector 408-1 is selected. In some embodiments, if the RBI profile selector 408-1 is not selected, then a user may not be able to interact with (e.g., click on and/or select) the selectable RBI protected browsing action icons.

The selectable RBI protected browsing action icons 412-1, 412-2, 412-3, 412-4, 412-5, 412-6, and 412-N that are selected are included in the RBI policy, and the selectable RBI protected browsing action icons that are unselected are not included in the RBI policy. In an embodiment, the selectable RBI protected browsing action icons that are selected are indicated by a selected indicator (e.g., a checkmark in a semicircle) and/or a selected color (e.g., green, blue, white, etc.). In another embodiment, the selectable RBI protected browsing action icons that are unselected are indicated by an unselected indicator (e.g., a line through a circle) and/or an unselected color (e.g., gray, red, orange, etc.).

The selectable RBI protected browsing action icons 412-1, 412-2, 412-3, 412-4, 412-5, 412-6, and 412-N are displayed as being a square shape, but may also be a rectangular shape, circular shape, or the like. In some embodiments, the selectable RBI protected browsing action icons may be outlined by a frame or a border that surrounds the symbol, the label, and/or the selection indicator. The selectable RBI protected browsing action icons are displayed linearly with the RBI profile selector 408-1 and the RBI profile identifier text 410-1. The selectable RBI protected browsing action icons are also displayed as being adjacent to the RBI profile identifier text 410-1 on one side, and adjacent to an edge of the RBI profile selection menu 404 on another side.

Although not shown, the selectable RBI protected browsing action icons may also be displayed between the RBI profile selector and the RBI profile identifier text, between the RBI profile selection menu 404 and the RBI profile selector, or somewhere else near the other elements included in spatially grouped set 406-1. Examples of the selectable RBI protected browsing action icons 412-1, 412-2, 412-3, 412-4, 412-5, 412-6, and 412-N are described in further detail with reference to FIG. 8 and FIGS. 9A-9G.

Figure 5:
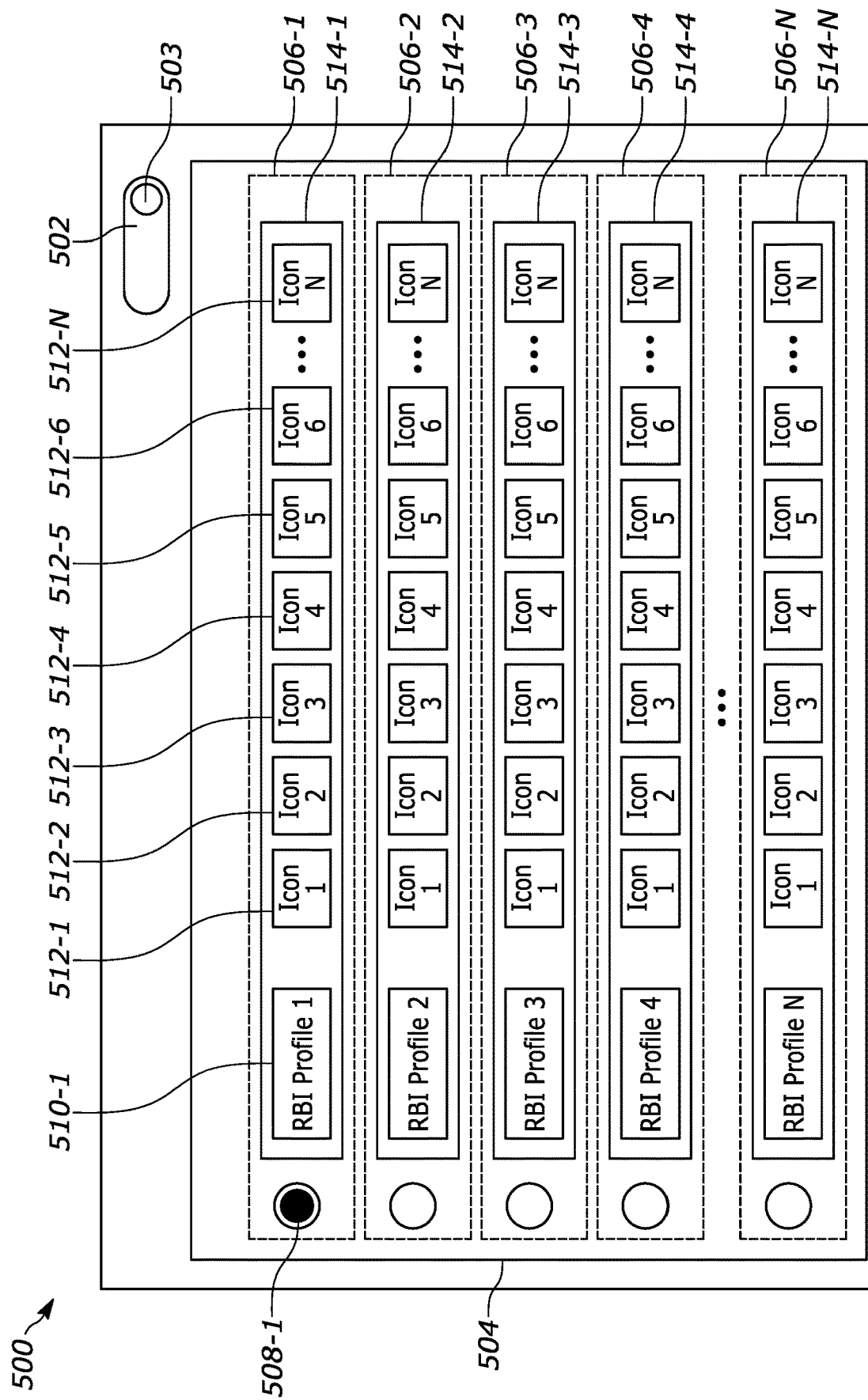
FIG. 5 depicts another example of an RBI configuration window that includes an on/off activation feature and an RBI profile selection menu.

FIG. 5 depicts another example of an RBI configuration window 500 that includes an on/off activation feature 502 and an RBI profile selection menu 504. The on/off activation feature 502 includes an on/off indicator 503, and the RBI profile selection menu 504 includes a plurality of spatially grouped sets 506-1, 506-2, 506-3, 506-4, and 506-N that include RBI profile selectors (e.g., RBI profile selector 508-1), RBI profile identifier text (e.g., RBI profile identifier text 510-1), and selectable RBI protected browsing action icons (e.g., selectable RBI protected browsing action icons 512-1, 512-2, 512-3, 512-4, 512-5, 512-6, and 512-N) as previously described with reference to FIG. 4.

In contrast to FIG. 4, the spatially grouped sets 506-1, 506-2, 506-3, 506-4, and 506-N shown in FIG. 5 include corresponding RBI profile panels, implemented as RBI profile panels 514-1, 514-2, 514-3, 514-4, and 514-N. In an embodiment, RBI profile panel 514-N represents a fifth or greater RBI profile panel. The RBI profile identifier text and the selectable RBI protected browsing action icons of corresponding RBI profiles are displayed linearly within the RBI profile panels. For example, RBI profile panel 514-1 includes the RBI profile identifier text 510-1 and selectable RBI protected browsing action icons 512-1, 512-2, 512-3, 512-4, 512-5, 512-6, and 512-N. In an embodiment, the RBI profile selectors of the corresponding RBI profiles are adjacent to the RBI profile panels. Although five RBI profile panels are shown in FIG. 5, there may also be less than five RBI profile panels. In addition, the shape of the RBI profile panels may be changed according to the shape of the plurality of spatially grouped sets, or according to the spatial arrangement of the RBI profile identifier text and the selectable RBI protected browsing action icons.

Figure 6:
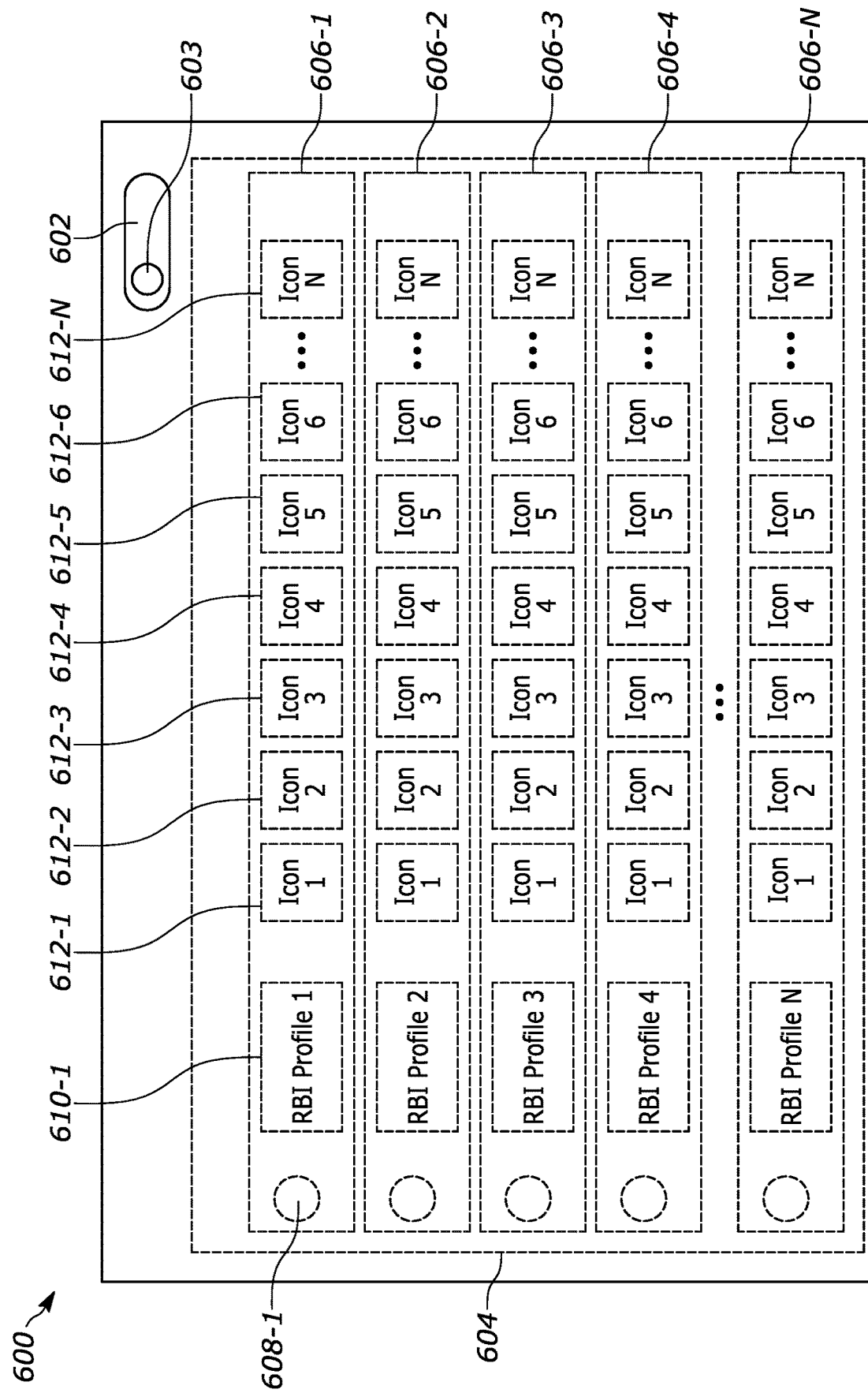
FIG. 6 depicts another example of an RBI configuration window that includes an on/off activation feature and an RBI profile selection menu.

FIG. 6 depicts another example of an RBI configuration window 600 that includes an on/off activation feature 602 and an RBI profile selection menu 604. The on/off activation feature 602 includes an on/off indicator 603, and the RBI profile selection menu 604 includes a plurality of spatially grouped sets 606-1, 606-2, 606-3, 606-4, and 606-N that include RBI profile selectors (e.g., RBI profile selector 608-1), RBI profile identifier text (e.g., RBI profile identifier text 610-1), and selectable RBI protected browsing action icons (e.g., selectable RBI protected browsing action icons 612-1, 612-2, 612-3, 612-4, 612-5, 612-6, and 612-N) as previously described with reference to FIG. 4.

In contrast to FIG. 4, the on/off activation feature 602 is set to the "OFF" state, such that the on/off indicator 603 is on a left side of the on/off activation feature. When the on/off activation feature 602 is set to the "OFF" state, RBI is not enabled, an RBI policy may not be configured, and the user is not able to interact with (e.g., click on) the elements included in the RBI profile selection menu 604. As such, the RBI profile selection menu 604, the RBI profile selectors (e.g., RBI profile selector 608-1), the RBI profile identifier text (e.g., RBI profile identifier text 610-1), and the selectable RBI protected browsing action icons (e.g., selectable RBI protected browsing action icons 612-1, 612-2, 612-3, 612-4, 612-5, 612-6, and 612-N) are all shown by dashed lines which represent that the elements included in the RBI profile selection menu may be grayed out, hidden, and/or inaccessible to the user.

Figure 7:
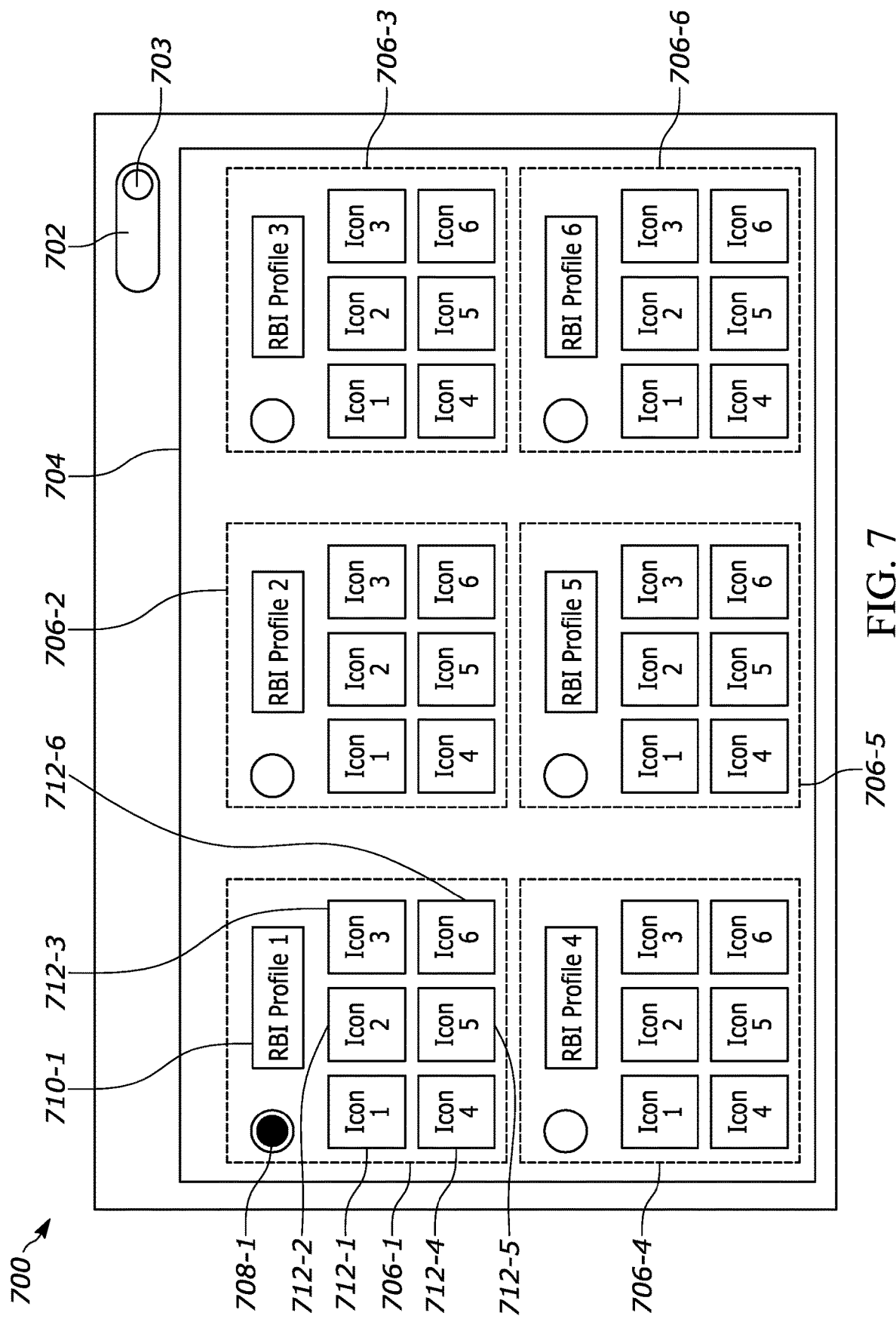
FIG. 7 depicts another example of an RBI configuration window that includes an on/off activation feature and an RBI profile selection menu.

FIG. 7 depicts another example of an RBI configuration window 700 that includes an on/off activation feature 702 and an RBI profile selection menu 704. The on/off activation feature 702 includes an on/off indicator 703, and the RBI profile selection menu 704 includes a plurality of spatially grouped sets 706-1, 706-2, 706-3, 706-4, 706-5, and 706-6 that include RBI profile selectors (e.g., RBI profile selector 708-1), RBI profile identifier text (e.g., RBI profile identifier text 710-1), and selectable RBI protected browsing action icons (e.g., selectable RBI protected browsing action icons 712-1, 712-2, 712-3, 712-4, 712-5, 712-6) as previously described with reference to FIG. 4.

In contrast to FIG. 4, there are six spatially grouped sets 706-1, 706-2, 706-3, 706-4, 706-5, and 706-6 that are displayed in a series of clusters (e.g., rectangular clusters). In addition, for each spatially grouped set, the RBI profile selector (e.g., RBI profile selector 708-1) is displayed in an upper left portion and the RBI profile identifier text (e.g., RBI profile identifier text 710-1) is displayed in an upper center portion. Each spatially grouped set also includes six selectable RBI protected browsing action icons that are displayed in a series of rows (e.g., two rows) and in a series of columns (e.g., three columns).

Examples of selectable RBI protected browsing action icons are described in further detail with reference to FIG. 8 and FIGS. 9A-9G.

Figure 8:
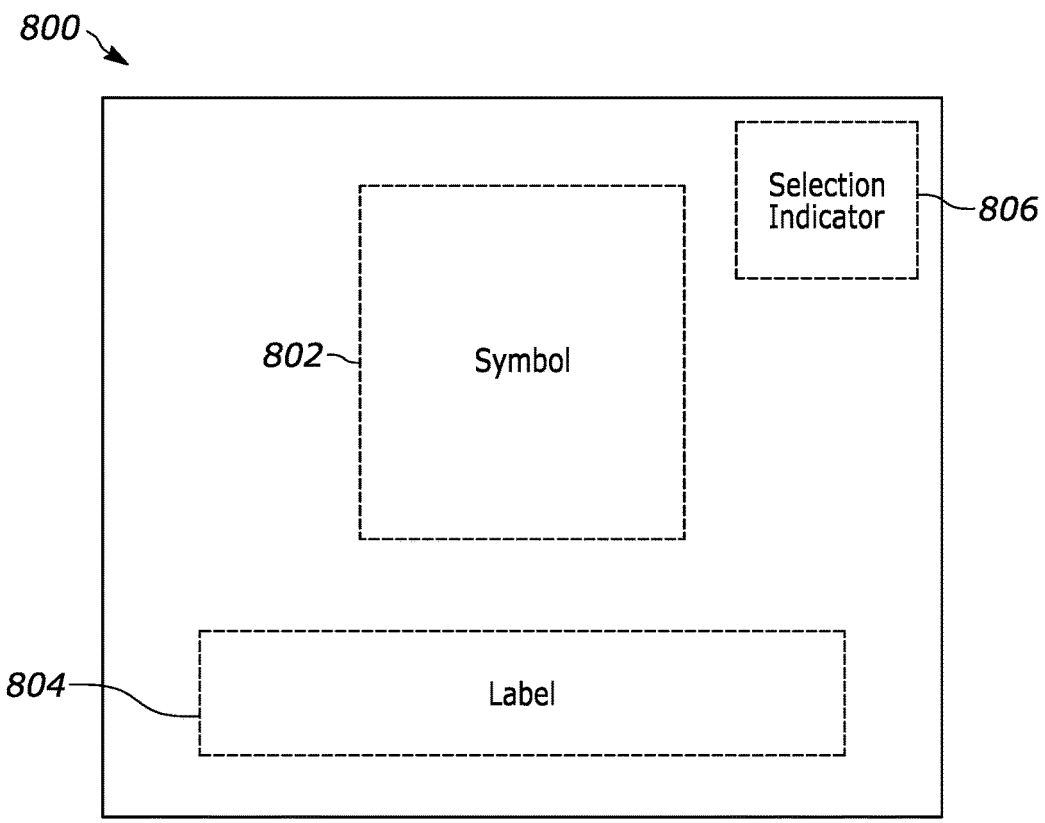
FIG. 8 depicts an outline of a selectable RBI protected browsing action icon that includes a symbol, a label, and a selection indicator.

FIG. 8 depicts an outline of a selectable RBI protected browsing action icon 800 that includes a symbol 802, a label 804, and a selection indicator 806. In an embodiment, the selectable RBI protected browsing action icon 800 represents the selectable RBI protected browsing action icons shown in FIGS. 4-7. The selectable RBI protected browsing action icon 800 corresponds to an RBI protected browsing action (e.g., read only, uploads, downloads, form submissions, clipboard access, cookie persistence, cookies, etc.) that may be included in an RBI profile as part of an RBI policy. As such, the selectable RBI protected browsing action icon 800 includes the symbol 802, the label 804, and the selection indicator 806 to indicate whether the corresponding RBI protected browsing action is included in the RBI profile as part of the RBI policy.

The symbol 802 is displayed in a center portion of the selectable RBI protected browsing action icon 800 above the label 804 and left of the selection indicator 806. As an example, the symbol is a book symbol, a page with an arrow symbol, a page symbol, a clipboard symbol, a cookie symbol, a cookie with a trash can symbol, or other symbol that indicates the corresponding RBI protected browsing action. In such an example, the corresponding RBI protected browsing actions are read only for the book symbol, uploads or downloads for the page with an arrow symbol, form submissions for the page symbol, clipboard access for the clipboard symbol, cookies for the cookie symbol, and cookie persistence for the cookie with a trash can symbol.

The label 804 is displayed in a lower center portion of the selectable RBI protected browsing action icon 800 below the symbol 802 and the selection indicator 806. As an example, the label is "read only", "uploads", "downloads", "form submissions", "clipboard access", "cookie persistence", "cookies", or other label that indicates the corresponding RBI protected browsing action.

The selection indicator 806 is displayed in an upper right portion of the selectable RBI protected browsing action icon 800 right of the symbol 802 and above the label 804. As an example, the selection indicator is a checkmark in a semicircle, a line through a circle, selection indicating text, or other type of selection indicator. In such an example, the checkmark in the semicircle indicates that the corresponding RBI protected browsing action is included in the RBI profile as part of the RBI policy, the line through the circle indicates that the corresponding RBI protected browsing action is not included in the RBI profile as part of the RBI policy, and the selection indicating text indicates that the corresponding RBI protected browsing action may be protected by a third party.

Although the selectable RBI protected browsing action icon 800 is shown as having certain elements (e.g., symbol 802, label 804, and selection indicator 806) in a certain arrangement, the selectable RBI protected browsing action icon is not limited to the elements and/or the arrangement shown in FIG. 8. For example, the symbol 802, the label 804, and/or the selection indicator 806 may or may not be included in the selectable RBI protected browsing action icon or may be in different areas of the selectable RBI protected browsing action icon.

Figure 9A:
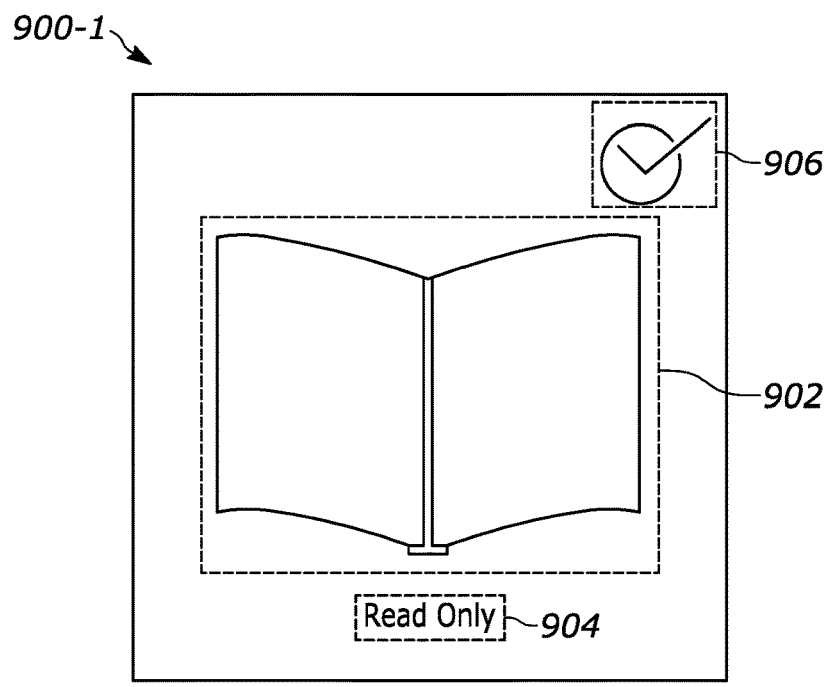
FIG. 9A depicts an example of a selectable RBI protected browsing action icon that corresponds to read only.

FIG. 9A depicts an example of a selectable RBI protected browsing action icon 900-1 that corresponds to read only. The selectable RBI protected browsing action icon 900 includes a symbol 902, a label 904, and a selection indicator 906 as previously described with reference to FIG. 8. In an embodiment, the symbol 902 is a book symbol, the label 904 is "read only", and the selection indicator 906 is a checkmark in a semicircle.

Figure 9B:
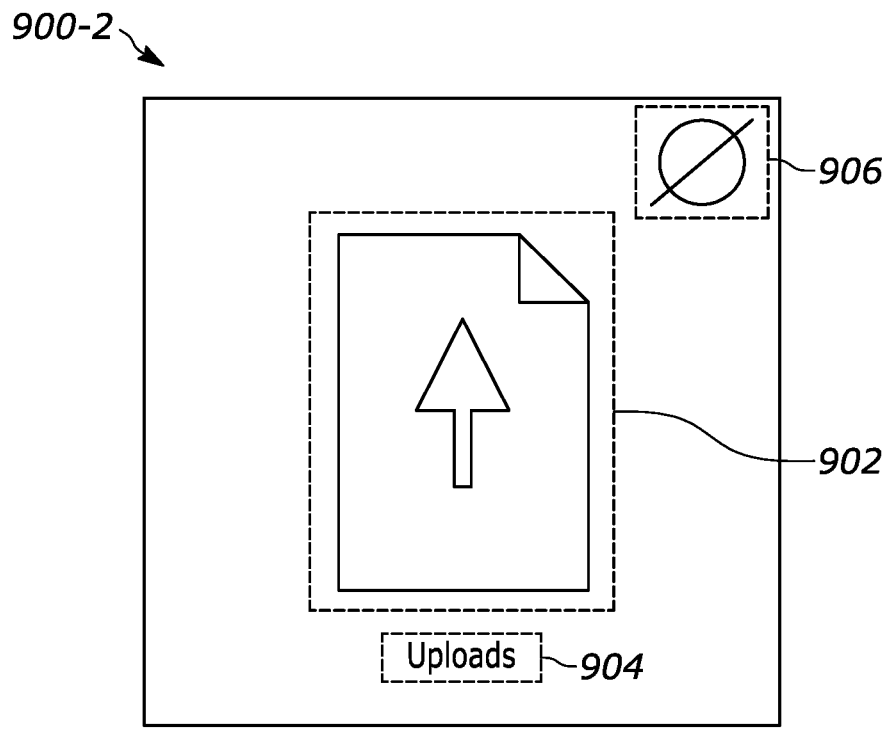
FIG. 9B depicts an example of a selectable RBI protected browsing action icon that corresponds to uploads.

FIG. 9B depicts an example of a selectable RBI protected browsing action icon 900-2 that corresponds to uploads. The selectable RBI protected browsing action icon 900 includes a symbol 902, a label 904, and a selection indicator 906 as previously described with reference to FIG. 8. In an embodiment, the symbol 902 is a page with an arrow symbol, the label 904 is "uploads", and the selection indicator 906 is a line through a circle.

Figure 9C:
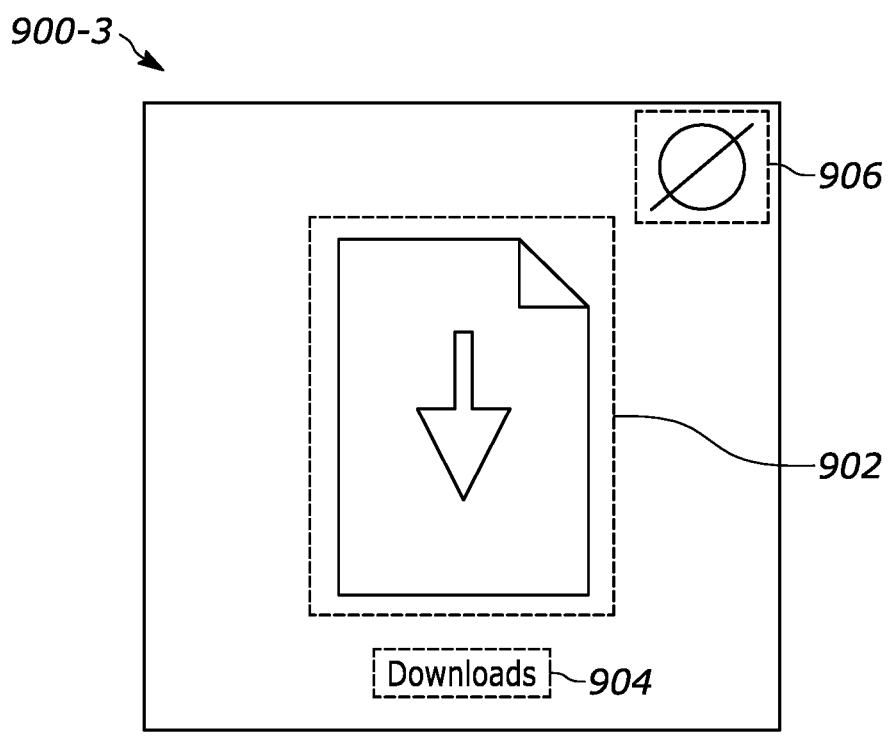
FIG. 9C depicts an example of a selectable RBI protected browsing action icon that corresponds to downloads.

FIG. 9C depicts an example of a selectable RBI protected browsing action icon 900-3 that corresponds to downloads. The selectable RBI protected browsing action icon 900 includes a symbol 902, a label 904, and a selection indicator 906 as previously described with reference to FIG. 8. In an embodiment, the symbol 902 is a page with an arrow symbol, the label 904 is "downloads", and the selection indicator 906 is a line through a circle.

Figure 9D:
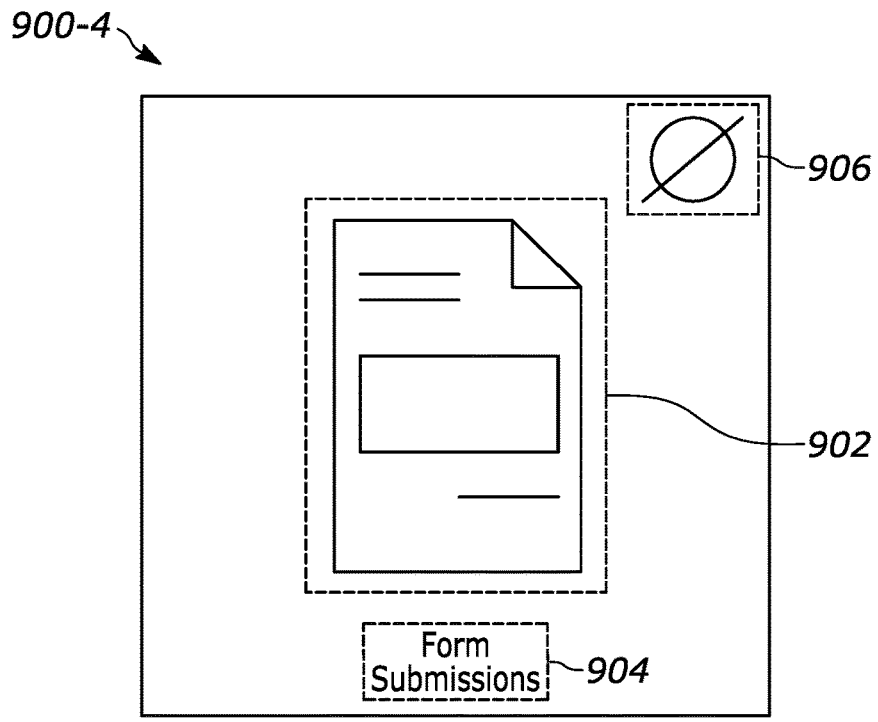
FIG. 9D depicts an example of a selectable RBI protected browsing action icon that corresponds to form submissions.

FIG. 9D depicts an example of a selectable RBI protected browsing action icon 900-4 that corresponds to form submissions. The selectable RBI protected browsing action icon 900 includes a symbol 902, a label 904, and a selection indicator 906 as previously described with reference to FIG. 8. In an embodiment, the symbol 902 is a page symbol, the label 904 is "form submissions", and the selection indicator 906 is a line through a circle.

Figure 9E:
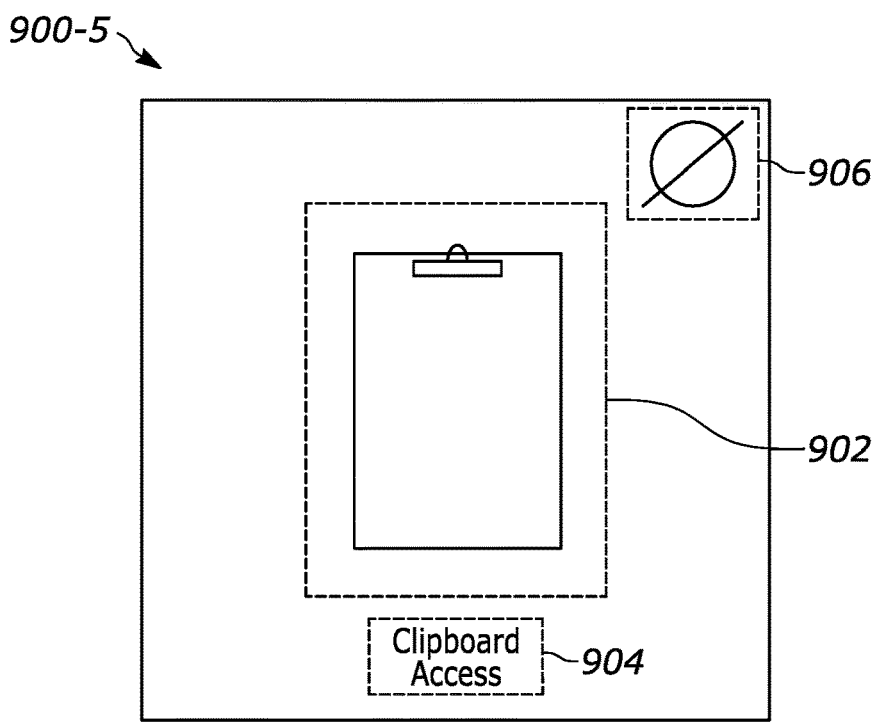
FIG. 9E depicts an example of a selectable RBI protected browsing action icon that corresponds to clipboard access.

FIG. 9E depicts an example of a selectable RBI protected browsing action icon 900-5 that corresponds to clipboard access. The selectable RBI protected browsing action icon 900 includes a symbol 902, a label 904, and a selection indicator 906 as previously described with reference to FIG. 8. In an embodiment, the symbol 902 is a clipboard symbol, the label 904 is "clipboard access", and the selection indicator 906 is a checkmark in a line through a circle.

Figure 9F:
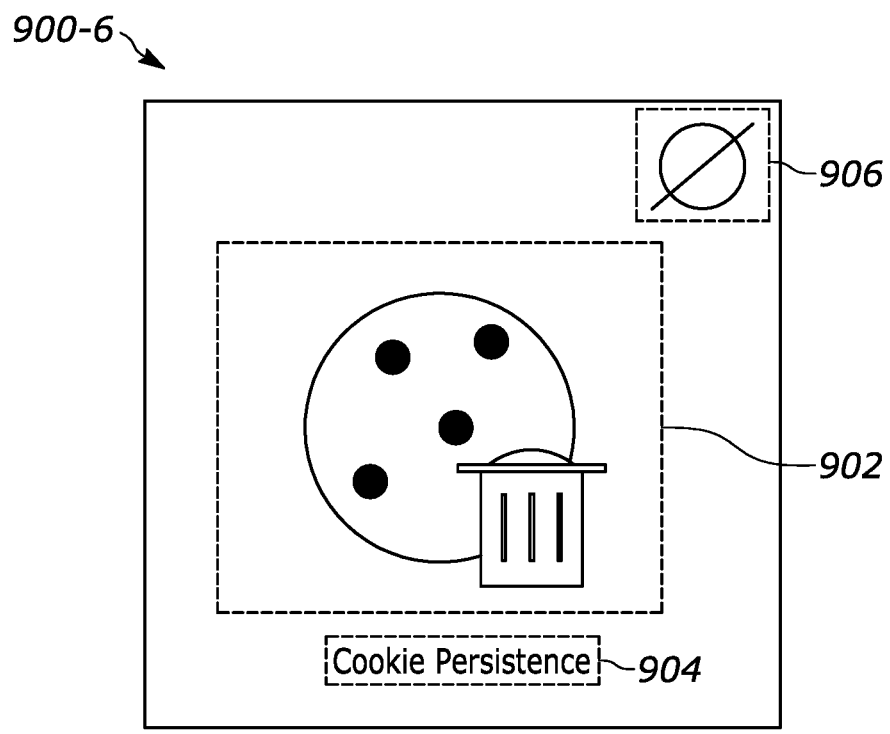
FIG. 9F depicts an example of a selectable RBI protected browsing action icon that corresponds to cookie persistence.

FIG. 9F depicts an example of a selectable RBI protected browsing action icon 900-6 that corresponds to cookie persistence. The selectable RBI protected browsing action icon 900 includes a symbol 902, a label 904, and a selection indicator 906 as previously described with reference to FIG. 8. In an embodiment, the symbol 902 is a cookie with a trash can symbol, the label 904 is "cookie persistence", and the selection indicator 906 is a line through a circle.

Figure 9G:
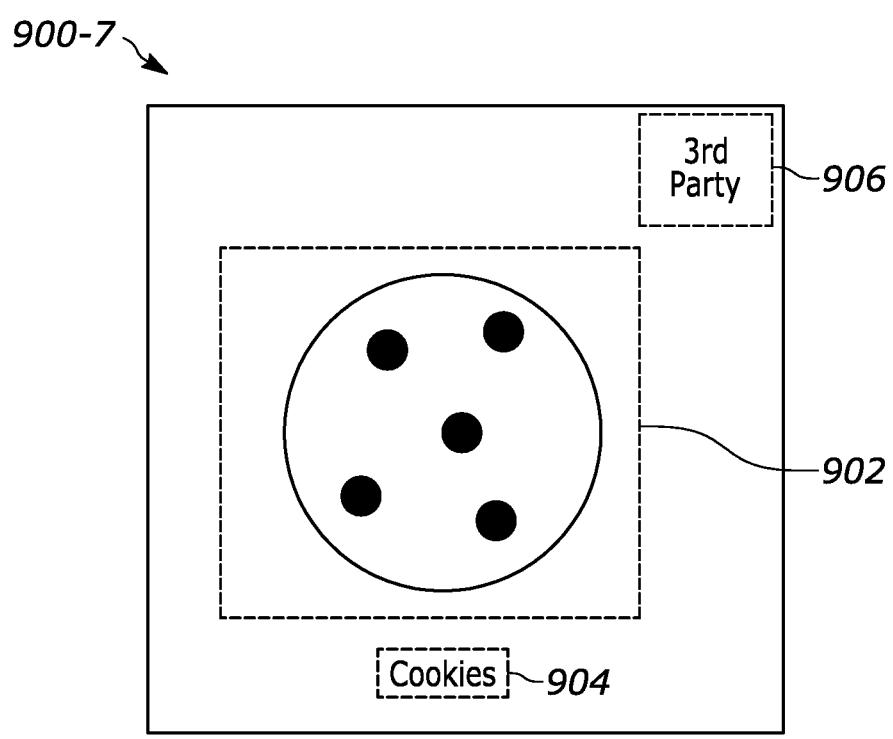
FIG. 9G depicts an example of a selectable RBI protected browsing action icon that corresponds to cookies.

FIG. 9G depicts an example of a selectable RBI protected browsing action icon 900-7 that corresponds to cookies. The selectable RBI protected browsing action icon 900 includes a symbol 902, a label 904, and a selection indicator 906 as previously described with reference to FIG. 8. In an embodiment, the symbol 902 is a cookie symbol, the label 904 is "cookies", and the selection indicator 906 is selection indicating text that indicates "$3^{rd}$ Party".

With reference to FIG. 8 and FIGS. 9A-9G, the selectable RBI protected browsing action icons graphically indicate to a user in a single window, a combination of RBI protected browsing actions that will be active for an RBI profile of an RBI policy. In some embodiments, the selectable RBI protected browsing action icons are a profile specific set of icons for a corresponding RBI profile. In such an embodiment, the profile specific set may be the same or different for each corresponding RBI profile of spatially grouped sets. The symbol, the label, and/or the selection indicator of the selectable RBI protected browsing action icons make it easy for the user to ascertain the combination of RBI protected browsing actions that are activated for the RBI profile of the RBI policy. For example, the user may be able to visually interpret from the symbols, the labels, and/or the selection indicators the combination of RBI protected browsing actions that are activated in an RBI profile.

Figure 10:
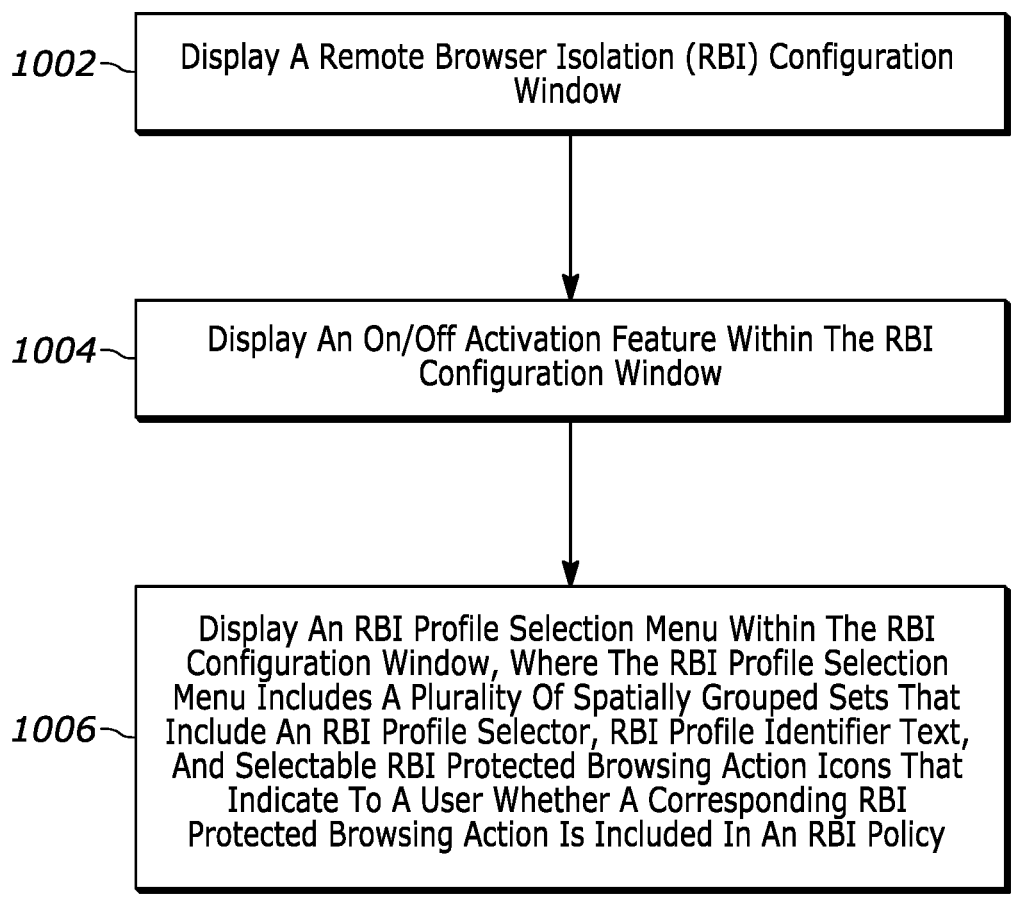
FIG. 10 illustrates a flow diagram of a technique for displaying an RBI configuration window in accordance with an embodiment of the invention.

FIG. 10 illustrates a flow diagram of a technique for displaying an RBI configuration window in accordance with an embodiment of the invention. At block 1002, an RBI configuration window is displayed. At block 1004, an on/off activation feature within the RBI configuration window. At block 1006, an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

In some embodiments, the technique for displaying an RBI configuration window includes a non-transitory computer readable medium including instructions to be executed in a computer system. For example, the instructions when executed in the computer system perform a technique that includes displaying an RBI protected browser, displaying a border at least partially around the RBI protected browser, and displaying a security feature within the border, where the border and the security feature indicate to a user that the RBI protected browser is RBI protected.

In some embodiments, the technique for displaying an RBI configuration window is performed by a system. For example, the system includes at least one processor configured to execute computer readable instructions stored in at least memory, where the computer readable instructions when executed by the at least one processor perform a method comprising displaying an RBI configuration window, displaying an on/off activation feature within the RBI configuration window, and displaying an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

In some embodiments, a technique for displaying an RBI policy involves displaying an RBI configuration window, displaying an on/off activation feature within the RBI configuration window, and displaying an RBI profile selection menu within the RBI configuration window, where the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or a combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, random access memory (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a Redundant Array of Independent Drives (RAID) array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A non-transitory computer readable medium comprising instructions to be executed in a computer system, wherein the instructions when executed in the computer system perform a method comprising:
    displaying a remote browser isolation (RBI) configuration window;
    displaying an on/off activation feature within the RBI configuration window; and
    displaying an RBI profile selection menu within the RBI configuration window, wherein the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

2. The non-transitory computer readable medium of claim 1, wherein the spatially grouped sets that include the RBI profile selector, the RBI profile identifier text, and the selectable RBI protected browsing action icons are displayed in a series of rows within the RBI profile selection menu.

3. The non-transitory computer readable medium of claim 1, wherein the spatially grouped sets that include the RBI profile selector, the RBI profile identifier text, and the selectable RBI protected browsing action icons correspond to RBI profiles.

4. The non-transitory computer readable medium of claim 3, wherein the RBI profile identifier text and the selectable RBI protected browsing action icons of the corresponding RBI profiles are displayed linearly within RBI profile panels.

5. The non-transitory computer readable medium of claim 3, wherein:
    the RBI profile identifier text and the selectable RBI protected browsing action icons of the corresponding RBI profiles are displayed linearly within RBI profile panels; and
    the RBI profile selectors of the corresponding RBI profiles are adjacent to the RBI profile panels.

6. The non-transitory computer readable medium of claim 1, wherein when one of the RBI profile selectors is selected, the selectable RBI protected browsing action icons that correspond to a same RBI profile can be selected.

7. The non-transitory computer readable medium of claim 1, wherein the selectable RBI protected browsing action icons include a symbol, a label, and a selection indicator.

8. The non-transitory computer readable medium of claim 7, wherein:
the symbol is at least one of a book symbol, a page with an arrow symbol, a page symbol, a clipboard symbol, a cookie symbol, and a cookie with a trash can symbol;
the label is at least one of read only, uploads, downloads, form submissions, clipboard access, cookie persistence, and cookies; and
the selection indicator is at least one of a checkmark in a semicircle, a line through a circle, and selection indicating text.

9. The non-transitory computer readable medium of claim 1, wherein the selectable RBI protected browsing action icons that are selected are indicated by at least one of a selected indicator and a selected color.

10. The non-transitory computer readable medium of claim 9, wherein:
the selected indicator is a checkmark in a semicircle; and
the selected color is green.

11. The non-transitory computer readable medium of claim 1, wherein the selectable RBI protected browsing action icons that are unselected are indicated by at least one of an unselected indicator and an unselected color.

12. The non-transitory computer readable medium of claim 11, wherein:
the unselected indicator is a line through a circle; and
the unselected color is gray.

13. The non-transitory computer readable medium of claim 1, wherein:
the selectable RBI protected browsing action icons that are selected are included in the RBI policy; and
the selectable RBI protected browsing action icons that are unselected are not included in the RBI policy.

14. The non-transitory computer readable medium of claim 1, wherein when the on/off activation feature is set to off, the RBI profile selector of the plurality of spatially grouped sets cannot be selected.

15. The non-transitory computer readable medium of claim 1, wherein the on/off activation feature is displayed by a togglable button that controls whether RBI is enabled.

16. The non-transitory computer readable medium of claim 1, wherein:
the RBI profile identifier text indicates corresponding RBI profiles; and
the corresponding RBI profiles include read only, preview downloads, allow downloads, block uploads, and full interaction.

17. The non-transitory computer readable medium of claim 1, wherein:
the spatially grouped sets that include the RBI profile selector, the RBI profile identifier text, and the selectable RBI protected browsing action icons correspond to an RBI profile, wherein the selectable RBI protected browsing action icons are a profile specific set of icons for the corresponding RBI profile; and
the selectable RBI protected browsing action icons include a symbol, a label, and a selection indicator, wherein the symbol and the label indicate the corresponding RBI protected browsing action and the selection indicator indicates whether the corresponding RBI protected browsing action is included in the RBI policy.

18. The non-transitory computer readable medium of claim 1, wherein:
the spatially grouped sets that include the RBI profile selector, the RBI profile identifier text, and the selectable RBI protected browsing action icons correspond to an RBI profile and are displayed linearly within the RBI profile selection menu; and
the selectable RBI protected browsing action icons include a symbol, a label, and a selection indicator, wherein the symbol and the label indicate the corresponding RBI protected browsing action and the selection indicator indicates whether the corresponding RBI protected browsing action is included in the RBI policy.

19. A system comprising:
at least one processor configured to execute computer readable instructions stored in at least memory, wherein the computer readable instructions when executed by the at least one processor perform a method comprising:
displaying a remote browser isolation (RBI) configuration window;
displaying an on/off activation feature within the RBI configuration window; and
displaying an RBI profile selection menu within the RBI configuration window, wherein the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

20. A method for displaying a remote browser isolation (RBI) policy, the method comprising:
displaying an RBI configuration window;
displaying an on/off activation feature within the RBI configuration window; and
displaying an RBI profile selection menu within the RBI configuration window, wherein the RBI profile selection menu includes a plurality of spatially grouped sets that include an RBI profile selector, RBI profile identifier text, and selectable RBI protected browsing action icons that indicate to a user whether a corresponding RBI protected browsing action is included in an RBI policy.

* * * * *